(12) United States Patent
Balappanavar et al.

(10) Patent No.: US 10,517,124 B2
(45) Date of Patent: Dec. 24, 2019

(54) LOCATION AND NAVIGATION PATH-ASSISTED BEAM MANAGEMENT

(71) Applicant: Intel Corporation, Santa Clara, CA (US)

(72) Inventors: Subhas Balappanavar, Portland, OR (US); Sreenivas Kasturi, Hillsboro, OR (US)

(73) Assignee: Intel IP Corp, Santa Clara, CA (US)

( * ) Notice: Subject to any disclaimer, the term of this patent is extended or adjusted under 35 U.S.C. 154(b) by 20 days.

(21) Appl. No.: 15/857,736

(22) Filed: Dec. 29, 2017

(65) Prior Publication Data

US 2019/0053296 A1     Feb. 14, 2019

(51) Int. Cl.
*H04W 40/12*     (2009.01)
*H04W 76/10*     (2018.01)
*H04W 16/28*     (2009.01)
*H04W 40/20*     (2009.01)

(52) U.S. Cl.
CPC ........... *H04W 76/10* (2018.02); *H04W 16/28* (2013.01); *H04W 40/12* (2013.01); *H04W 40/20* (2013.01); *H04W 40/205* (2013.01)

(58) Field of Classification Search
CPC ..... H04W 76/10; H04W 40/20; H04W 16/28; H04W 40/12
See application file for complete search history.

(56) References Cited

U.S. PATENT DOCUMENTS

| | | | |
|---|---|---|---|
| 9,537,561 | B1* | 1/2017 | Kotecha ............. H04B 7/18506 |
| 9,927,807 | B1* | 3/2018 | Ganjoo ................. H04W 76/10 |
| 2015/0131616 | A1* | 5/2015 | Jo .................... H04W 36/00835 370/331 |
| 2016/0276307 | A1* | 9/2016 | Lin ...................... H01L 23/5381 |
| 2017/0195893 | A1* | 7/2017 | Lee ........................ H04W 16/28 |
| 2019/0044609 | A1* | 2/2019 | Winkle .............. H04B 7/18504 |

FOREIGN PATENT DOCUMENTS

WO     2017196491 A1     11/2017

* cited by examiner

*Primary Examiner* — Walli Z Butt
(74) *Attorney, Agent, or Firm* — Jordan IP Law, LLC (57) ABSTRACT

Systems, apparatuses and methods may provide for technology that determines line of sight information for a plurality of base stations based on relative signal strengths, a location and a planned navigation path of a mobile system. Additionally, the technology may favor a base station from the plurality of base stations based on the line of sight information, select a beam combination that is optimal for the favored base station, and form a communication link on a beam combination corresponding to the mobile system and the favored base station.

17 Claims, 7 Drawing Sheets

LOCATION AND NAVIGATION PATH-ASSISTED BEAM MANAGEMENT

TECHNICAL FIELD

Embodiments generally relate to wireless telecommunications. More particularly, embodiments relate to location and navigation path-assisted beam management in wireless telecommunications.

BACKGROUND

Wireless telecommunications may involve the exchange of millimeter wave (e.g., between 30 GHz and 300 GHz) transmissions between user equipment (UE) and various base stations (e.g., cell towers) in a cellular network. When the user equipment is moving (e.g., in a vehicle), handovers (e.g., handoffs) may be conducted from one base station to another, wherein the base station with the strongest signal strength relative to the UE may typically be selected to receive the handover. Due to the line of sight (LOS) nature of millimeter waves, obstructions (e.g., buildings, trees, overpasses) located along the path of travel may trigger more frequent handovers between base stations. Depending on the complexity of the handover process, increased latency and/or lower throughput may be experienced. Moreover, the increased latency/lower throughput may present significant challenges in certain settings such as autonomous driving environments that rely on high throughput and low latency wireless data connections for safety concerns.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1A:
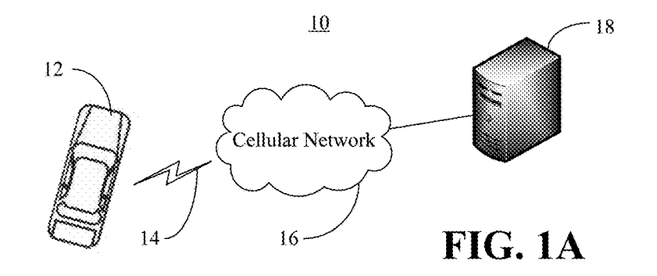
FIGS. 1A and 1B are illustrations of examples of wireless communications in autonomous vehicle settings according to an embodiment.

Turning now to FIG. 1A, a communications architecture 10 is shown in which a mobile system 12 (e.g., autonomous vehicle) exchanges wireless transmissions 14 with a cellular network 16 (e.g., collection of base stations, switches, etc.), which is in turn coupled to a cloud computing infrastructure 18 (e.g., server network). In one example, the wireless transmissions 14 are millimeter wave transmissions that propagate primarily by line of sight. For example, the wireless transmissions 14 may neither be reflected by the ionosphere nor travel along the Earth's surface as ground waves as in the case of lower frequency radio waves. Accordingly, obstructions (e.g., buildings, trees, overpasses) between the mobile system 12 and the base stations of the cellular network 16 may trigger base station handovers while the mobile system 12 travels along a given path/route. As will be discussed in greater detail, signals and/or data indicating the location of the mobile system 12 and the planned navigation path of the mobile system 12 may be used to reduce the frequency and complexity of base station handovers. Such an approach may decrease latency and increase throughput from the perspective of the mobile station 12. In one example, the cellular network 16 is a GSM (Global System for Mobile Communications), W-CDMA (Wideband Code-Division Multiple Access), LTE (Long Term Evolution), 5G ($5^{th}$ Generation Mobile Network) and/or other suitable network.

Figure 1B:
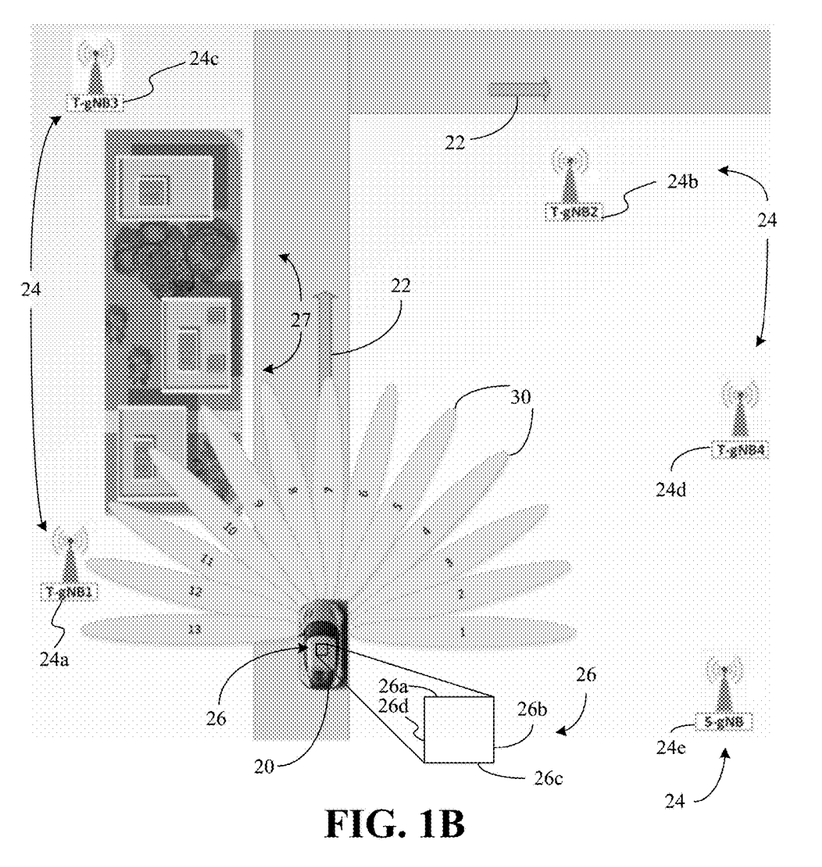

FIG. 1B shows a performance-enhanced mobile system 20 (e.g., autonomous vehicle) that is traveling along a planned navigation path 22. In the illustrated example, a plurality of base stations 24 (24a-24e) are located near the planned navigation path 22. During travel, various obstructions 27 (e.g., buildings, trees) may block the line of sight between the mobile system 20 and the base stations 24. For example, the obstructions 27 may block the line of sight between a first base station 24a (first target next generation nodeB/"T-gNB1") once the mobile system 20 travels in front of the obstructions 27. Similarly, the obstructions 27 may block the line of sight between a third base station 24c ("T-gNB3") until the mobile system 20 travels beyond the obstructions 27. By contrast, the illustrated obstructions 27 do not block the line of sight between a second base station 24b ("T-gNB2"), a fourth base station ("T-gNB4") or a fifth base station 24e (source gNodeB/"S-gNB") at any point along the planned navigation path 22.

Of particular note is that if the mobile system 20 were to form a communication link with (e.g., attach/connect to) the first base station 24a (e.g., having the highest signal strength), the illustrated mobile system 20 would conduct a handoff shortly thereafter (e.g., once line of sight is blocked by trees and/or buildings). The technology described herein enables the location of the mobile system 20 and the planned navigation path 22 be used to maintain line of sight between the mobile system and one or more of the base stations 24 for the longest period of time. For example, the mobile system 20 might form a communication link with the second base station 24b rather than the first base station 24b to prevent handovers from occurring. As a result, the frequency of base station handovers may be reduced, which enhances performance.

Moreover, line of sight information may be used to reduce the complexity of base station handovers. For example, if the mobile system 20 uses a plurality of antenna panels 26 (26a-26d) to communicate with the base stations 24, one or more of the antenna panels 26 might be eliminated from consideration. Thus, the mobile system 20 may consider a first panel 26a and a second panel 26b during handover because the first and second panels 26a, 26b are expected to receive wireless transmissions from the second base station 24b, the fourth base station 24d and the fifth base station 24e in view of planned navigation path 22 (e.g., relatively long periods of time with line of sight). By contrast, the mobile system 20 may disregard a third panel 26c and a fourth panel 26d during handover because the third and fourth panels 26c, 26d are expected to receive wireless transmissions from the first base station 24a and the third base station 24c in view of the planned navigation path 22 (e.g., relatively short periods of time with line of sight). Eliminating the third and fourth panels 26c, 26d from consideration may substantially reduce search time (e.g., latency). As will be discussed in greater detail, the line of sight information may also be used to eliminate one or more antenna beams 30 from consideration, which may further reduce latency and enhance performance.

Figure 2:
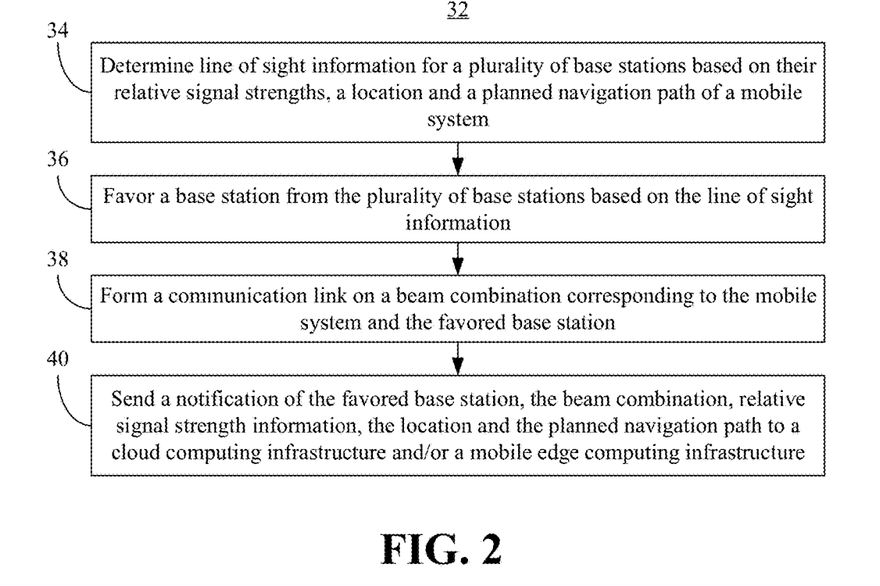
FIG. 2 is a flowchart of an example of a method of operating a mobile system according to an embodiment.

FIG. 2 shows a method 32 of operating a mobile system. The method 32 may generally be implemented in a mobile system such as, for example, the mobile system 12 (FIG. 1A) and/or the mobile system 20 (FIG. 1B). More particularly, the method 32 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 32 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 34 provides for determining line of sight information for a plurality of base stations based on their relative signal strengths, a location and a planned navigation path of a mobile system. The line of sight information may be determined based on data from a cloud computing infrastructure such as, for example, the cloud computing infrastructure 18 (FIG. 1A). The line of sight information may also be determined based on data from a mobile edge computing infrastructure in a base station of a cellular network such as, for example, the cellular network 16 (FIG. 1A). Thus, if the mobile system is a car in a fleet of autonomous vehicles, the cloud/mobile edge computing infrastructure might be involved in scheduling and/or establishing the travel route of the car. Map and/or topography data from the cloud/mobile edge servers may therefore enable an automated determination to be made as to how long each base station along the planned navigation path is expected to maintain line of sight with the mobile system.

The line of sight information may also include historical data from other vehicles that have traveled the same path. Thus, the historical data might indicate, on a per base station basis, how long an acceptable signal strength was measured at the mobile system during the trip. The line of sight information may contain other data (e.g., weather conditions) and may be obtained from other sources. Table I below demonstrates an example of a data structure (e.g., database) that might contain line of sight information.

TABLE I

| Travel Segment | Base Station | Distance (miles) | Time (seconds) |
|---|---|---|---|
| 1A | $gNB_i$ | .1 | 10.3 |
| 1A | $gNB_{i+1}$ | .1 | 10.3 |
| 1B | $gNB_i$ | .1 | 10.3 |
| 1C | $gNB_i$ | .1 | 10.3 |

Thus, a planned navigation path that includes travel segments 1A-1C might result in the mobile system maintaining LOS with base station $gNB_i$ for 30.9 s (e.g., all three segments). By contrast, the mobile system may maintain LOS with base station $gNB_{i+1}$ for only 10.3 s (e.g., segment 1A, after which a handover would be conducted). The data structure may also include beam data.

A base station may be favored at block 36 from the plurality of base stations based on the line of sight information. Favoring a base station may generally involve prioritizing a particular base station over others during a handover or connection procedure. In one example, block 36 identifies the base station with which the mobile system will maintain line of sight for the longest period of time relative to the remaining base stations in the plurality of base stations. Illustrated block 38 forms a communication link on a beam combination corresponding to the mobile system and the favored base station. The beam combination may include a particular antenna beam of the mobile system and a particular antenna beam of the favored base station. Block 38 may include, for example, sending a favorable report to a cellular network such as, for example, the cellular network 16 (FIG. 1A), wherein the favorable report corresponds to the favored base station.

In one example, the favorable report indicates that the "favored" base station is associated with high signal strength, even if it is actually associated with a lower signal strength. Thus, the favorable report may prevent the cellular network from handing the mobile system over to another base station associated with a higher signal strength than the favored base station if the other base station will maintain line of sight for a relatively short period of time. Block 38 may also include conducting other handover procedures (e.g., notifying the cellular network of the favored base station and/or beam combination), depending on the type of cellular network involved.

Additionally, block 40 may send a notification of the favored base station, the beam combination (e.g., beam indices), relative signal strength information, the location and the planned navigation path to one or more of a cloud computing infrastructure or a mobile edge computing infrastructure. Other data such as, for example, cell identifiers, weather conditions (e.g., snow, rain, sleet, fog) may also be sent at block 40. As already noted, the mobile system might be a car, van or bus in a fleet of autonomous vehicles, wherein the cloud and/or mobile edge computing infrastructure is involved in scheduling and/or establishing the travel route of the vehicle. Accordingly, the notification sent at block 40 may be incorporated into historical data that is subsequently used for other vehicles traveling the same path.

Figure 3:
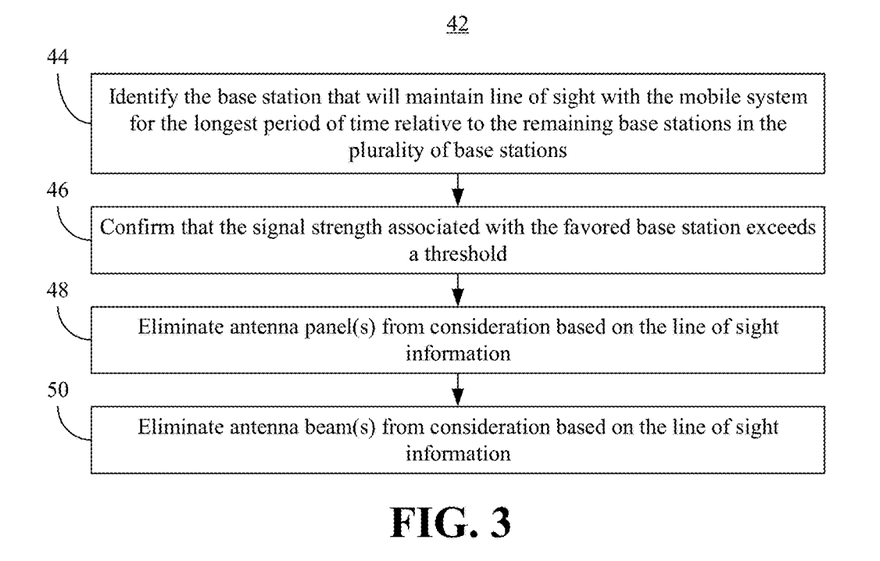
FIG. 3 is a flowchart of an example of a method of managing beams according to an embodiment.

FIG. 3 shows a method 42 of managing beams. The method 42 may generally be implemented in a mobile system such as, for example, the mobile system 12 (FIG. 1A) and/or the mobile system 20 (FIG. 1B). More particularly, the method 42 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 44 provides for identifying and/or selecting the base station that will maintain line of sight with the mobile system for the longest period of time relative to the remaining base stations in the plurality of base stations. Additionally, block 46 may confirm that the signal strength associated with the favored base station exceeds a threshold. The threshold may generally indicate the minimum acceptable signal strength that will enable the mobile system to maintain a specified quality of service (QoS). If the signal strength associated with the favored base station does not exceed the threshold, the base station having the next longest line of sight period may be favored. One or more antenna panels may be eliminated at block 48 from consideration based on the line of sight information. As already noted, the eliminated antenna panel(s) may correspond to directions not facing the favored base station. Illustrated block 50 eliminates one or more antenna beam(s) from consideration based on the line of sight information.

Figure 4:
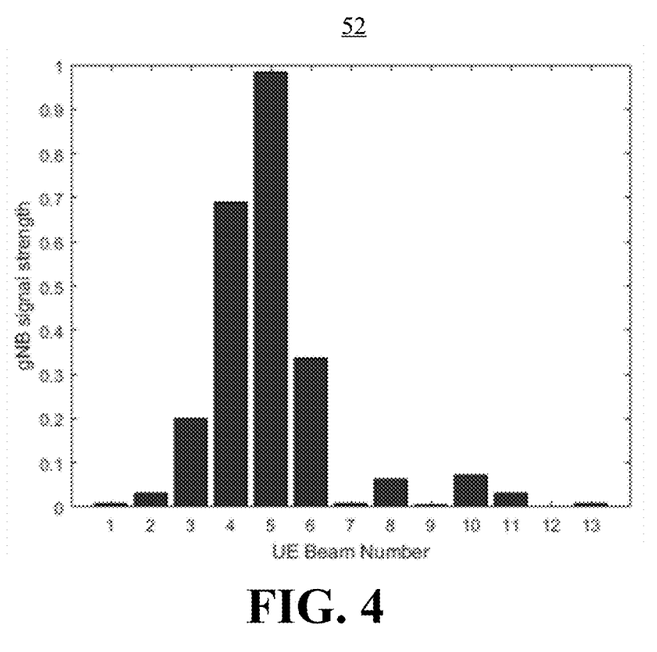
FIG. 4 is a chart of an example of beam signal strength data associated with a base station according to an embodiment.

With continuing reference to FIGS. 1B and 4, a chart 52 of beam signal strengths is shown for a favored base station. If, for example, the second base station 24b is favored, the line of sight information may be used to eliminate antenna beams that are expected to have relatively low signal strength. Thus, the line of sight information might indicate that due to the relative positioning between the mobile system 20 and the second base station 24b, only antenna beams 3-6 will be strong enough to warrant consideration when forming the communication link on a beam combination corresponding to the mobile station 20 and the second base station 24b. Eliminating antenna beams 1, 2 and 7-13 during the beam scan/search may substantially reduce latency. As the mobile system 20 travels along the planned navigation path 22, the mobile station 20 may predictively select the next antenna beam to continuously track the second base station 24b without conducting a re-scan.

Figure 5A:
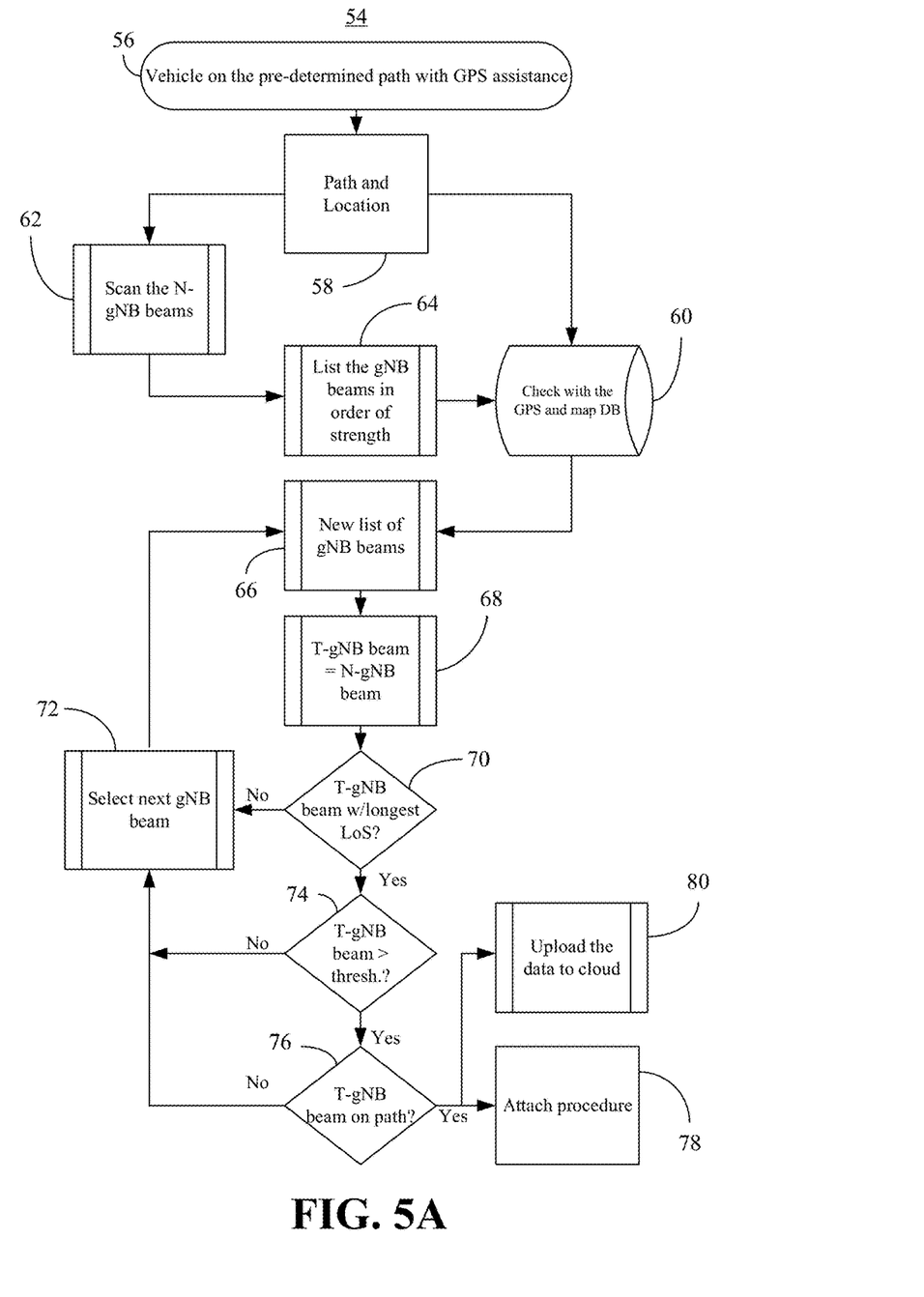
FIG. 5A is a flowchart of an example of a method of conducting power on operations in a mobile system according to an embodiment.

FIG. 5A shows a method 54 of conducting power on operations in a mobile system. The method 54 may generally be implemented in a mobile system such as, for example, the mobile system 12 (FIG. 1A) and/or the mobile system 20 (FIG. 1B). More particularly, the method 54 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 56 confirms that the vehicle (e.g., mobile system) is on the predetermined path (e.g., planned navigation path) with location (e.g., Global Positioning System/GPS) assistance. The vehicle path and location data 58 may be used to scan the new gNodeB ("N-gNB") beams at block 62. Illustrated block 64 lists the gNB beams in order of their signal strength, wherein the listing may be used along with the vehicle path and location data 58 to search a database 60 containing location and map information. An updated list of N-gNB beams (e.g., including associated LOS time periods) may be generated at block 66 based on the database search results. Block 68 may designate a gNB beam on the list as the T-gNB beam, wherein a determination may be made at block 70 as to whether the T-gNB beam has the longest line of sight (LOS) time period. If not, the next gNB beam on the list may be selected at block 72 and the illustrated method 54 repeats block 66. Once the gNB beam with the longest LOS time period has been designated as the T-gNB beam, block 74 determines whether the signal strength of the T-gNB beam exceeds a minimal threshold. If not, illustrated block 72 selects another gNB beam from the list.

If it is determined at block 74 that the signal strength exceeds the threshold. A determination may be made at block 76 as to whether the T-gNB beam is on the planned navigation path. If not, block 72 may select another gNB beam from the list. Otherwise, illustrated block 78 initiates an attachment procedure to form a communication link via the T-gNB beam. Additionally, a notification of the T-gNB beam (e.g., and the selected base station), the beam combination, relative signal strength information, the location and/or the planned navigation path may be uploaded to the cloud at block 80.

Figure 5B:
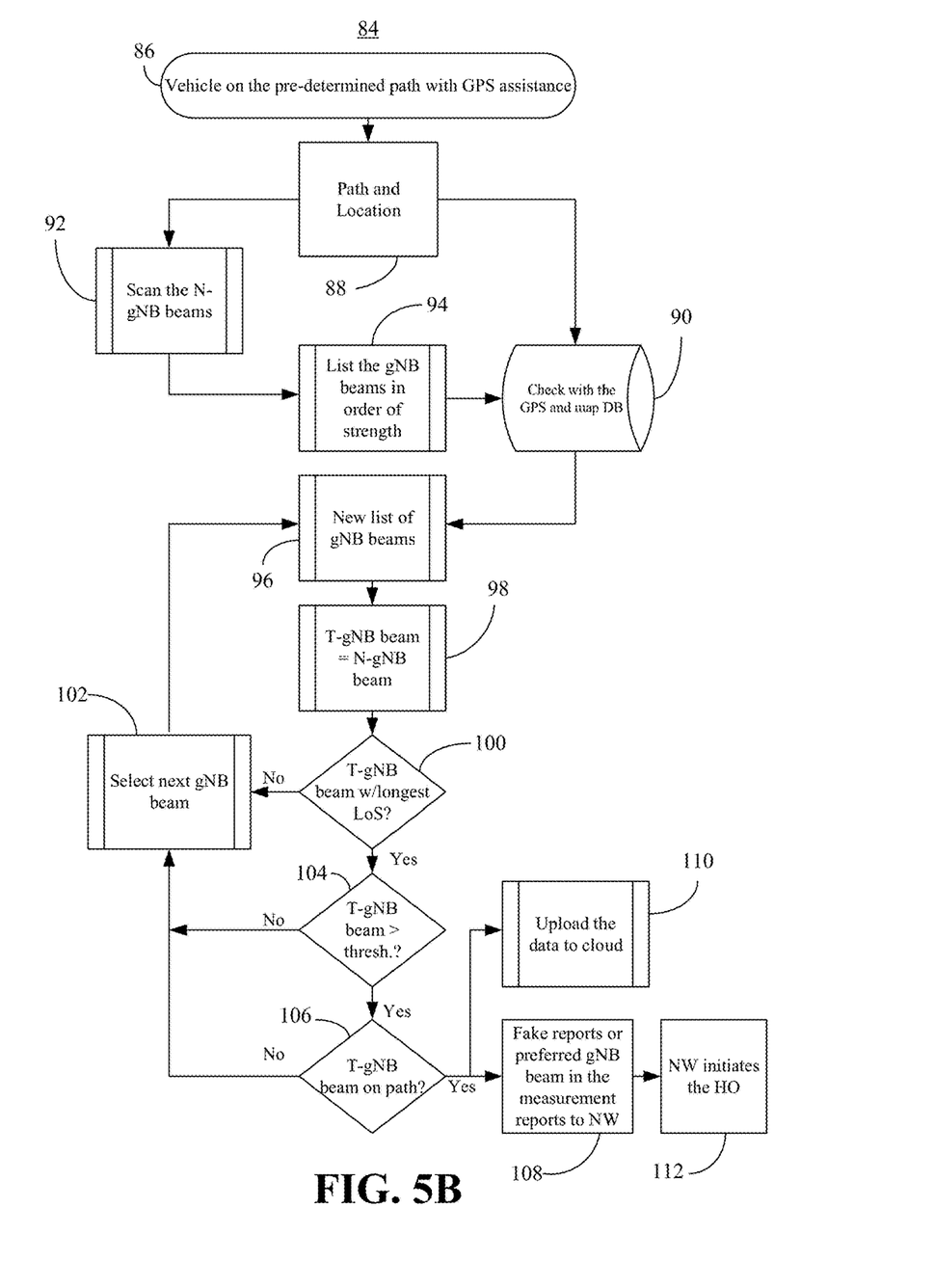
FIG. 5B is a flowchart of an example of a method of conducting handover operations in a mobile system according to an embodiment.

FIG. 5B shows a method 84 of conducting handover operations in a mobile system. The method 84 may generally be implemented in a mobile system such as, for example, the mobile system 12 (FIG. 1A) and/or the mobile system 20 (FIG. 1B). More particularly, the method 84 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 86 confirms that the vehicle (e.g., mobile system) is on the predetermined path (e.g., planned navigation path) with location (e.g., GPS) assistance. The vehicle path and location data 88 may be used to scan the N-gNB beams at block 92. Illustrated block 94 lists the gNB beams in order of their signal strength, wherein the listing may be used along with the vehicle path and location data 88 to search a database 90 containing location and map information. An updated list of N-gNB beams (e.g., including LOS time periods) may be generated at block 96 based on the database search results. Block 98 may designate a gNB beam on the list as the T-gNB beam, wherein a determination may be made at block 100 as to whether the T-gNB beam has the longest LOS time period. If not, the next gNB beam on the list may be selected at block 102 and the illustrated method 84 repeats block 96. Once the gNB beam with the longest LOS time period has been designated as the T-gNB beam, block 104 determines whether the signal strength of the T-gNB beam exceeds a minimal threshold. If not, illustrated block 102 selects another gNB beam from the list.

If it is determined at block 104 that the signal strength exceeds the threshold. A determination may be made at block 106 as to whether the T-gNB beam is on the planned navigation path. If not, block 102 may select another gNB beam from the list. Otherwise, illustrated block 108 initiates an attachment procedure to form a communication link via the T-gNB beam. Additionally, a notification of the T-gNB beam (e.g., and the favored base station), the beam combination, relative signal strength information, the location and/or the planned navigation path may be uploaded to the cloud at block 140.

Figure 5C:
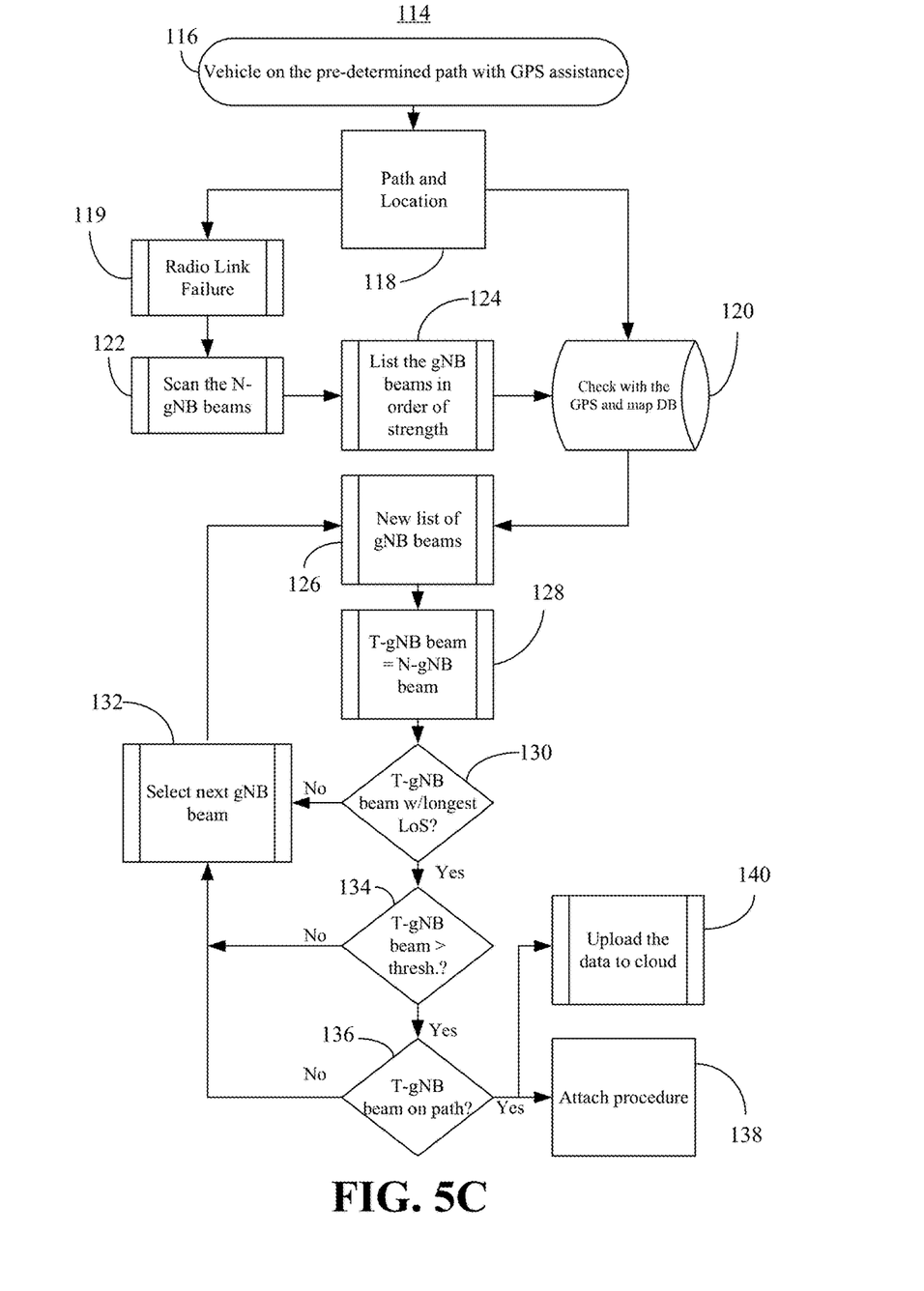
FIG. 5C is a flowchart of an example of a method of handling radio link failures according to an embodiment.

FIG. 5C shows a method 114 of handling radio link failures. The method 114 may generally be implemented in a mobile system such as, for example, the mobile system 12 (FIG. 1A) and/or the mobile system 20 (FIG. 1B). More particularly, the method 114 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 116 confirms that the vehicle (e.g., mobile system) is on the predetermined path (e.g., planned navigation path) with location (e.g., GPS) assistance. A radio link failure may occur at block 119, wherein the vehicle path and location data 118 may be used to scan the N-gNB beams in response to the radio link failure at block 122. Illustrated block 124 lists the gNB beams in order of their signal strength, wherein the listing may be used along with the vehicle path and location data 118 to search a database 120 containing location and map information. An updated list of N-gNB beams (e.g., including LOS time periods) may be generated at block 126 based on the database search results. Block 128 may designate a gNB beam on the list as the T-gNB beam, wherein a determination may be made at block 130 as to whether the T-gNB beam has the longest LOS time period. If not, the next gNB beam on the list may be selected at block 132 and the illustrated method 114 repeats block 126. Once the gNB beam with the longest LOS time period has been designated as the T-gNB beam, block 134 may determine whether the signal strength of the T-gNB beam exceeds a minimal threshold. If not, illustrated block 132 selects another gNB beam from the list.

If it is determined at block 134 that the signal strength exceeds the threshold. A determination may be made at block 136 as to whether the T-gNB beam is on the planned navigation path. If not, block 132 may select another gNB beam from the list. Otherwise, illustrated block 138 sends one or more false (e.g., "fake") signal strength reports/measurements or an indication of the optimal LOS gNB beam to the cellular network (NW), wherein the cellular network may initiate the handover ("HO") at block 112. Additionally, a notification of the T-gNB beam (e.g., and the favored base station), the beam combination, relative signal strength information, the location and/or the planned navigation path may be uploaded to the cloud at block 110.

Figure 6:
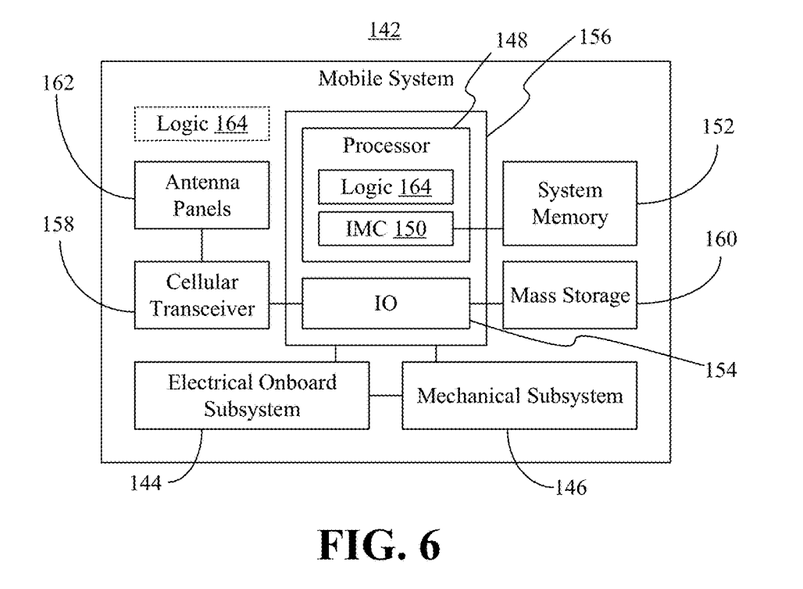
FIG. 6 is a block diagram of an example of a mobile system according to an embodiment.

Turning now to FIG. 6, a performance-enhanced mobile system 142 is shown. The mobile system 142 may be an autonomous vehicle such as, for example, an autonomous car, airplane, spacecraft, and so forth. In the illustrated example, the system 142 includes an electrical onboard subsystem 144 (e.g., instrument panels, embedded controllers, sensors, etc.), a mechanical subsystem 146 (e.g., drivetrain, internal combustion engines, fuel injectors, pumps, etc.) and one or more processors 148 (e.g., host processor(s), central processing unit(s)/CPU(s) with one or more processor cores) having an integrated memory controller (IMC) 150 that is coupled to a system memory 152.

The illustrated system 142 also includes an input output (10) module 154 implemented together with the processor(s) 148 on a semiconductor die 156 as a system on chip (SoC), wherein the 10 module 154 functions as a host device and may communicate with, for example, a cellular transceiver 158 (e.g., GSM, W-CDMA, LTE, 5G), and mass storage 160 (e.g., hard disk drive/HDD, optical disk, solid state drive/SSD, flash memory). The cellular transceiver 158 may be coupled to a plurality of antenna panels 162 such as, for example, the antenna panels 26 (FIG. 1B), already discussed. The processor(s) 148 may include logic 164 (e.g., logic instructions, configurable logic, fixed-functionality hardware logic, etc., or any combination thereof) to perform one or more aspects of the method 32 (FIG. 2), the method 42 (FIG. 3), the method 54 (FIG. 5A), the method 84 (FIG. 5B) and/or the method 114 (FIG. 5C). Thus, the logic 164 may enable the mobile system 142 to determine line of sight information for a plurality of base stations based on their relative signal strengths, a location and a planned navigation path of the mobile system 142, favor a base station from the plurality of base stations based on the line of sight information, and form a communication link on a beam combination corresponding to the mobile station 142 and the favored base station. Although the logic 164 is shown as being located within the processor 148, the logic 164 may be located elsewhere in the mobile system 142.

Figure 7:
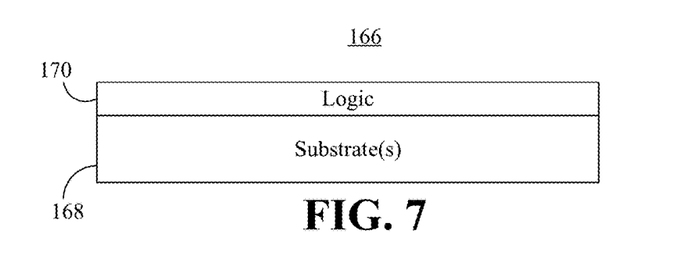
FIG. 7 is an illustration of an example of a semiconductor package apparatus according to an embodiment.

FIG. 7 shows a semiconductor package apparatus 166. The apparatus 166 may implement one or more aspects of the method 32 (FIG. 2), the method 42 (FIG. 3), the method 54 (FIG. 5A), the method 84 (FIG. 5B) and/or the method 114 (FIG. 5C) and may be readily substituted for the semiconductor die 156 (FIG. 5), already discussed. The illustrated apparatus 166 includes one or more substrates 168 (e.g., silicon, sapphire, gallium arsenide) and logic 170 (e.g., transistor array and other integrated circuit/IC components) coupled to the substrate(s) 168. The logic 170 may be implemented at least partly in configurable logic or fixed-functionality logic hardware. In one example, the logic 170 includes transistor channel regions that are positioned (e.g., embedded) within the substrate(s) 168. Thus, the interface between the logic 170 and the substrate(s) 168 may not be an abrupt junction. The logic 170 may also be considered to include an epitaxial layer that is grown on an initial wafer of the substrate(s) 168.

ADDITIONAL NOTES AND EXAMPLES

Example 1 may include a performance-enhanced mobile system comprising a plurality of antenna panels, a cellular transceiver, a processor and a memory including a set of instructions, which when executed by the processor, cause the mobile system to determine line of sight information for a plurality of base stations based on their relative signal strengths, a location and a planned navigation path of the mobile system, favor a base station from the plurality of base stations based on the line of sight information, and form, via the cellular transceiver and one or more of the antenna panels, a communication link on a beam combination corresponding to the mobile system and the favored base station.

Example 2 may include the mobile system of Example 1, wherein the mobile system is to maintain line of sight with the favored base station for a longest period of time relative to remaining base stations in the plurality of base stations.

Example 3 may include the mobile system of Example 1, wherein, when executed, the instructions cause the mobile system to eliminate one or more of an antenna panel or an antenna beam of the mobile system from consideration based on the line of sight information.

Example 4 may include the mobile system of Example 1, wherein the line of sight information is to be determined based on data from one or more of a cloud computing infrastructure or a mobile edge computing infrastructure.

Example 5 may include the mobile system of Example 1, wherein, when executed, the instructions cause the mobile system to send a notification of the favored base station, the beam combination, relative signal strength information, the location and the planned navigation path to one or more of a cloud computing infrastructure or a mobile edge computing infrastructure.

Example 6 may include a semiconductor package apparatus comprising one or more substrates, and logic coupled to the one or more substrates, wherein the logic is implemented in one or more of configurable logic or fixed-functionality hardware logic, the logic coupled to the one or more substrates to determine line of sight information for a plurality of base stations based on their relative signal strengths, a location and a planned navigation path of a mobile system, favor a base station from the plurality of base stations based on the line of sight information, and form a communication link on a beam combination corresponding to the mobile system and the favored base station.

Example 7 may include the semiconductor package apparatus of Example 6, wherein the mobile system is to maintain line of sight with the favored base station for a longest period of time relative to remaining base stations in the plurality of base stations.

Example 8 may include the semiconductor package apparatus of Example 6, wherein the logic coupled to the one or more substrates is to eliminate one or more of an antenna panel or an antenna beam of the mobile system from consideration based on the line of sight information.

Example 9 may include the semiconductor package apparatus of Example 6, wherein the line of sight information is to be determined based on data from one or more of a cloud computing infrastructure or a mobile edge computing infrastructure.

Example 10 may include the semiconductor package apparatus of Example 6, wherein the logic coupled to the one or more substrates is to send a notification of the favored base station, the beam combination, relative signal strength information, the location and the planned navigation path to one or more of a cloud computing infrastructure or a mobile edge computing infrastructure.

Example 11 may include the semiconductor package apparatus of any one of Examples 6 to 10, wherein the logic coupled to the one or more substrates is to send a favorable report to a cellular network, and wherein the a favorable report is to correspond to the favored base station.

Example 12 may include the semiconductor package apparatus of any one of Examples 6 to 10, wherein the logic coupled to the one or more substrates is to confirm that a signal strength associated with the favored base station exceeds a threshold.

Example 13 may include the semiconductor package apparatus of any one of Examples 6 to 10, wherein the logic coupled to the one or more substrates includes transistor channel regions that are positioned within the one or more substrates.

Example 14 may include a method comprising determining line of sight information for a plurality of base stations based on their relative signal strengths, a location and a planned navigation path of a mobile system, favoring a base station from the plurality of base stations based on the line of sight information, and forming a communication link on a beam combination corresponding to the mobile system and the favored base station.

Example 15 may include the method of Example 14, wherein the mobile system maintains line of sight with the favored base station for a longest period of time relative to remaining base stations in the plurality of base stations.

Example 16 may include the method of Example 14, further including eliminating one or more of an antenna panel or an antenna beam of the mobile system from consideration based on the line of sight information.

Example 17 may include the method of Example 14, wherein the line of sight information is determined based on data from one or more of a cloud computing infrastructure or a mobile edge computing infrastructure.

Example 18 may include the method of Example 14, further including sending a notification of the favored base station, the beam combination, relative signal strength information, the location and the planned navigation path to one or more of a cloud computing infrastructure or a mobile edge computing infrastructure.

Example 19 may include at least one computer readable storage medium comprising a set of instructions, which when executed by a mobile system, cause the mobile system to determine line of sight information for a plurality of base stations based on their relative signal strengths, a location and a planned navigation path of the mobile system, favor a base station from the plurality of base stations based on the line of sight information, and form a communication link on a beam combination corresponding to the mobile system and the favored base station.

Example 20 may include the at least one computer readable storage medium of Example 19, wherein the mobile system is to maintain line of sight with the favored base station for a longest period of time relative to remaining base stations in the plurality of base stations.

Example 21 may include the at least one computer readable storage medium of Example 19, wherein the instructions, when executed, cause the mobile system to eliminate one or more of an antenna panel or an antenna beam of the mobile system from consideration based on the line of sight information.

Example 22 may include the at least one computer readable storage medium of Example 19, wherein the line of sight information is to be determined based on data from one or more of a cloud computing infrastructure or a mobile edge computing infrastructure.

Example 23 may include the at least one computer readable storage medium of Example 19, wherein the instructions, when executed, cause the mobile system to send a notification of the favored base station, the beam combination, relative signal strength information, the location and the planned navigation path to one or more of a cloud computing infrastructure or a mobile edge computing infrastructure.

Example 24 may include the at least one computer readable storage medium of any one of Examples 19 to 23, wherein the instructions, when executed, cause the mobile system to send a favorable report to a cellular network, and wherein the a favorable report is to correspond to the favored base station.

Example 25 may include the at least one computer readable storage medium of any one of Examples 19 to 23, wherein the instructions, when executed, cause the mobile system to confirm that a signal strength associated with the favored base station exceeds a threshold.

Example 26 may include a semiconductor package apparatus comprising means for performing the method of any one of Examples 14 to 18.

Thus, technology described herein may use line of sight information that indicates the directionality between the base station and the UE (e.g., rather than mere coverage maps that associate base station areas of coverage with GPS locations). This directionality may be particularly advantageous in determining the correct UE beam to use in millimeter wave systems. The technology may enable optimal base station selection, wherein an antenna beam that is on the navigation path is prioritized over an antenna beam with a strong signal but is not on the navigation path. Additionally, rapid antenna beam selection may be achieved, wherein the UE is cognizant of the relative location of the target base station and may scan a minimal set of beams/panels to identify the strongest antenna beam quickly and unambiguously. Moreover, the UE may upload the beam data to the cloud so that other vehicles in the same location may use the information in real-time.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A mobile system comprising:
a plurality of antenna panels;
a cellular transceiver;
a processor; and
a memory including a set of instructions, which when executed by the processor, cause the mobile system to:
determine line of sight information for a plurality of base stations based on their relative signal strengths, a location and a planned navigation path of the mobile system,
favor a base station from the plurality of base stations based on the line of sight information, wherein the mobile system is to maintain a line of sight with the favored base station for a longest period of time relative to remaining base stations in the plurality of base stations, and
eliminate one or more of an antenna panel or an antenna beam of the mobile system from consideration based on the line of sight information, and
form, via the cellular transceiver and one or more of the antenna panels, a communication link on a beam combination corresponding to the mobile system and the favored base station to reduce the frequency and complexity of base station handovers.

2. The mobile system of claim 1, wherein the line of sight information is to be determined based on data from one or more of a cloud computing infrastructure or a mobile edge computing infrastructure.

3. The mobile system of claim 1, wherein, when executed, the instructions cause the mobile system to send a notification of the favored base station, the beam combination, relative signal strength information, the location and the planned navigation path to a cloud computing or mobile edge computing infrastructure.

4. A semiconductor package apparatus comprising:
one or more substrates; and
logic coupled to the one or more substrates, wherein the logic is implemented in one or more of configurable logic or fixed-functionality hardware logic, the logic coupled to the one or more substrates to:
determine line of sight information for a plurality of base stations based on their relative signal strengths, a location and a planned navigation path of a mobile system,
favor a base station from the plurality of base stations based on the line of sight information, wherein the mobile system is to maintain line of sight with the favored base station for a longest period of time relative to remaining base stations in the plurality of base stations, and
eliminate one or more of an antenna panel or an antenna beam of the mobile system from consideration based on the line of sight information, and
form a communication link on a beam combination corresponding to the mobile system and the favored base station to reduce the frequency and complexity of base station handovers.

5. The semiconductor package apparatus of claim 4, wherein the line of sight information is to be determined based on data from one or more of a cloud computing or a mobile edge computing infrastructure.

6. The semiconductor package apparatus of claim 4, wherein the logic coupled to the one or more substrates is to send a notification of the favored base station, the beam combination, relative signal strength information, the location and the planned navigation path to one or more of a cloud computing infrastructure or a mobile edge computing infrastructure.

7. The semiconductor package apparatus of claim 4, wherein the logic coupled to the one or more substrates is to send a favorable report to a cellular network, and wherein the favorable report is to correspond to the favored base station.

8. The semiconductor package apparatus of claim 4, wherein the logic coupled to the one or more substrates is to confirm that a signal strength associated with the favored base station exceeds a threshold.

9. The semiconductor package apparatus of any one of claim 4, wherein the logic coupled to the one or more substrates includes transistor channel regions that are positioned within the one or more substrates.

10. A method comprising:
determining line of sight information for a plurality of base stations based on their relative signal strengths, a location and a planned navigation path of a mobile system;
favoring a base station from the plurality of base stations based on the line of sight information, wherein the mobile system maintains line of sight with the favored base station for a longest period of time relative to remaining base stations in the plurality of base stations; and
eliminating one or more of an antenna panel or an antenna beam of the mobile system from consideration based on the line of sight information; and
forming a communication link on a beam combination corresponding to the mobile system and the favored base station to reduce the frequency and complexity of base station handovers.

11. The method of claim 10, wherein the line of sight information is determined based on data from one or more of a cloud computing infrastructure or a mobile edge computing infrastructure.

12. The method of claim 10, further including sending a notification of the favored base station, the beam combination, relative signal strength information, the location and the planned navigation path to one or more of a cloud computing infrastructure or a mobile edge computing infrastructure.

13. At least one non-transitory computer readable storage medium comprising a set of instructions, which when executed by a mobile system, cause the mobile system to:
determine line of sight information for a plurality of base stations based on relative signal strengths, a location and a planned navigation path of the mobile system;
favor a base station from the plurality of base stations based on the line of sight information, wherein the mobile system is to maintain line of sight with the favored base station for a longest period of time relative to remaining base stations in the plurality of base stations; and
eliminate one or more of an antenna panel or an antenna beam of the mobile system from consideration based on the line of sight information; and
form a communication link on a beam combination corresponding to the mobile system and the favored base station to reduce the frequency and complexity of base station handovers.

14. The at least one non-transitory computer readable storage medium of claim 13, wherein the line of sight information is to be determined based on data from one or more of a cloud computing infrastructure or a mobile edge computing infrastructure.

15. The at least one non-transitory computer readable storage medium of claim 13, wherein the instructions, when executed, cause the mobile system to send a notification of the favored base station, the beam combination, relative signal strength information, the location and the planned navigation path to one or more of a cloud computing infrastructure or a mobile edge computing infrastructure.

16. The at least one non-transitory computer readable storage medium of claim 13, wherein the instructions, when executed, cause the mobile system to send a favorable report to a cellular network, and wherein the favorable report is to correspond to the favored base station.

17. The at least one non-transitory computer readable storage medium of claim 13, wherein the instructions, when executed, cause the mobile system to confirm that a signal strength associated with the favored base station exceeds a threshold.

* * * * *